United States Patent [19]

Skow

[11] Patent Number: 5,249,762
[45] Date of Patent: Oct. 5, 1993

[54] STRAKES FOR LANDING SPEED REDUCTION

[75] Inventor: Andrew Skow, Rolling Hills Estates, Calif.

[73] Assignee: Eidetics Internation, Inc., Torrance, Calif.

[21] Appl. No.: 570,342

[22] Filed: Aug. 21, 1990

[51] Int. Cl.⁵ .......................... B64C 1/26; B64C 7/00; B64C 23/06
[52] U.S. Cl. ................................ 244/199; 244/45 A
[58] Field of Search ................ 244/91, 45 A, 199, 52, 244/55

[56] References Cited

U.S. PATENT DOCUMENTS

| | | | |
|---|---|---|---|
| 3,744,745 | 7/1973 | Kerker | 244/199 |
| 3,960,345 | 6/1976 | Cippert, Jr. | 244/199 |
| 4,569,494 | 2/1986 | Sakata | 244/199 |
| 4,685,643 | 8/1987 | Henderson et al. | 244/199 |
| 4,767,083 | 8/1988 | Koenig et al. | 244/55 X |
| 4,786,009 | 12/1988 | Rao et al. | 244/91 |
| 4,896,846 | 1/1990 | Strom | 244/52 X |

OTHER PUBLICATIONS

Jane's, All The World's Aircraft 1974-75, pp. 182, 183 (Saab AJ37 Viggen), pp. 790 & 793.

Primary Examiner—Joseph F. Peters, Jr.
Attorney, Agent, or Firm—Blakely, Sokoloff, Taylor & Zafman

[57] ABSTRACT

An engine inlet having strakes for landing speed reduction on a trapezoidal wing shaped aircraft, specifically the T-38. The strakes are mounted on the engine inlet just forward of the wing leading edge and well above the wing plane. The preferred strakes have an area greater than 3% of the wing area and are uncanted with respect to the wing. Use of the strakes forstalls wing buffet, yet exhibits well behaved longitudinal stability at high angles of attack thereby allowing operation of the aircraft at higher angles of attack and associated higher coefficients of lift, such as during landing, resulting in a reduction of the landing speed of the aircraft. Various strakes in the placement thereof are disclosed.

12 Claims, 3 Drawing Sheets

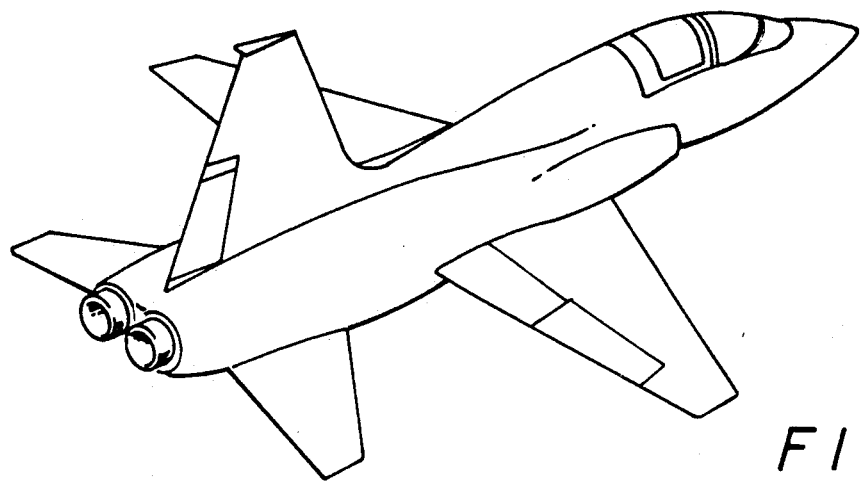
FIG. 1
PRIOR ART
FIG. 2
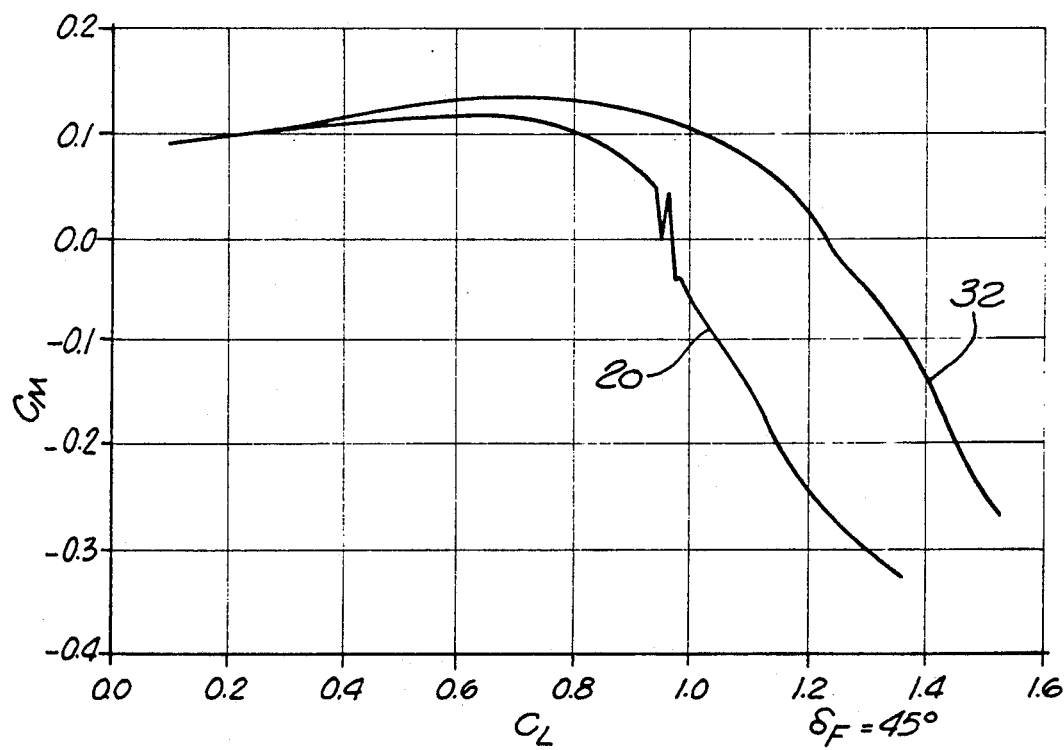

STRAKES FOR LANDING SPEED REDUCTION

BACKGROUND OF THE INVENTION

1. Field of the Invention

The present invention relates to the field of aerodynamics, and more particularly to methods and apparatus for the operation of aircraft at higher angles of attack and coefficients of lift, particularly when taking off and landing.

2. Prior Art

A modern high performance jet aircraft of simple configuration typically is comprised of a fuselage, swept back wings of a delta or trapezoidal configuration, and horizontal and vertical tail surfaces. Typically such basic configurations perform relatively well, though frequently it is desired to improve certain aspects of operation or performance thereof. Two aspects frequently sought to be improved are operation at lower speeds and higher angles of attack, and the enhancement of the stability and control of the aircraft.

Wing lift has also been increased in the past by adding a leading edge extension to the wings in the root area. While this somewhat increases the wing area, it also allows operation of the aircraft at higher angles of attack, thereby primarily increasing the coefficient of lift for the wing through an increase in the angle of attack. Such leading edge extensions typically are in the plane of the wing, and simply extend the wing forward in the root area thereof.

In still other situations, strakes have been used for various purposes, sometimes only fully appreciated by the designers that added the same to the basic aircraft configuration, the strakes correcting some undesired local flow or somehow controlling the flow to obtain some desired effect not otherwise inherent in the basic aircraft configuration. By way of specific example, the Mirage 2000, a French delta wing aircraft, has a small strake above and just forward of the wing root, the purpose of which is not apparent as the same is too small for any meaningful lift enhancement. A similar small strake appears on an Israeli modification of the Mirage, a delta wing aircraft as well. Similar strakes have heretofore not been used on trapezoidal wing aircraft. On the other hand, on the McDonnell Douglas MD-80 commercial airliner, small wing-like strakes are positioned well forward on the fuselage, much like a Canard configuration. On the DC-10, strakes are used on the engine housings under the wings thereof.

Finally, Northrop has demonstrated that a strake of significant size could be attached to the wing of a trapezoidal wing aircraft to extend the operation of the aircraft to higher angles of attack, yielding higher coefficients of lift. In essence such strakes locally extend the wing forward as in a leading edge extension. In the case of the present invention, however, it has been found that by moving the strakes to a position out of the plane of the wing, specifically to a position above the wing just forward thereof, similar increases in the angle of attack and coefficient lift of the aircraft may be achieved, though with improved pitch stability of the aircraft in comparison to the positioning of the same in the plane of the wings.

BRIEF DESCRIPTION OF THE INVENTION

Strakes for landing speed reduction on a trapezoidal wing aircraft, specifically the T-38, are disclosed. The strakes are mounted on the engine inlet nacelles just forward of the wing leading edge and well above the wing plane. The preferred strakes have an area of greater than 3% of the wing area. The strakes forestall wing buffet, yet exhibit well behaved longitudinal stability at high angles of attack, thereby allowing operation of the aircraft at higher angles of attack and associated higher coefficients of lift, such as during landing, resulting in a reduction of the landing speed of the aircraft. Various strakes and the placement thereof are disclosed.

BRIEF DESCRIPTION OF THE DRAWINGS

FIG. 1 is a perspective view of a T-38 aircraft of conventional configuration.

FIG. 2 presents curves for pitching moment versus coefficient of lift for the standard T-38 configuration and for a T-38 configuration incorporating the strakes of the present invention, both having a flap extension of 45 degrees.

DETAILED DESCRIPTION OF THE INVENTION

The present invention is primarily intended to reduce the landing speed of the T-38 aircraft by allowing the operation of the same at higher angles of attack and coefficients of lift, with or without flaps extended. Thus, while the concepts of the present invention should be applicable to aircraft of similar configurations, the preferred method and apparatus of the invention will be disclosed and described herein with respect to the T-38. As will be subsequently shown, the present invention substantially delays the onset of turbulence over the top of the wings, thereby reducing buffet and allowing operation at higher angles of attack. At the same time it has been found that the invention essentially extends the pitching moment curve in the airplane nose-up direction to higher angles of attack and associated lift coefficients, thereby maintaining better longitudinal stability at the higher angles than is characteristic of the basic T-38 configuration under similar conditions. In that regard, while it is believed that leading edge extensions would also delay the onset of strong buffeting, leading edge extensions have been found to yield undesirable longitudinal stability characteristics in certain T-38 aircraft configurations at the higher angles of attack, a phenomenon not experienced with the present invention.

Figure 3:
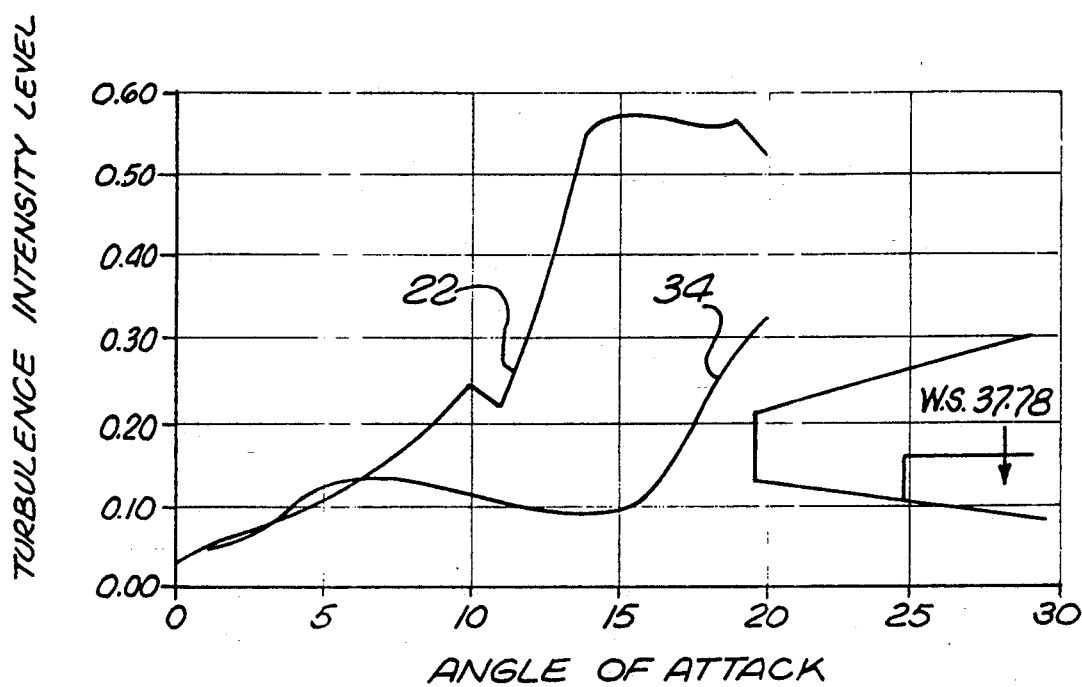
FIGS. 3, 4, and 5 present curves for the turbulence intensity level at three different wing stations for the standard T-38 configuration and for a T-38 configuration incorporating the strakes of the present invention.
Figure 4:
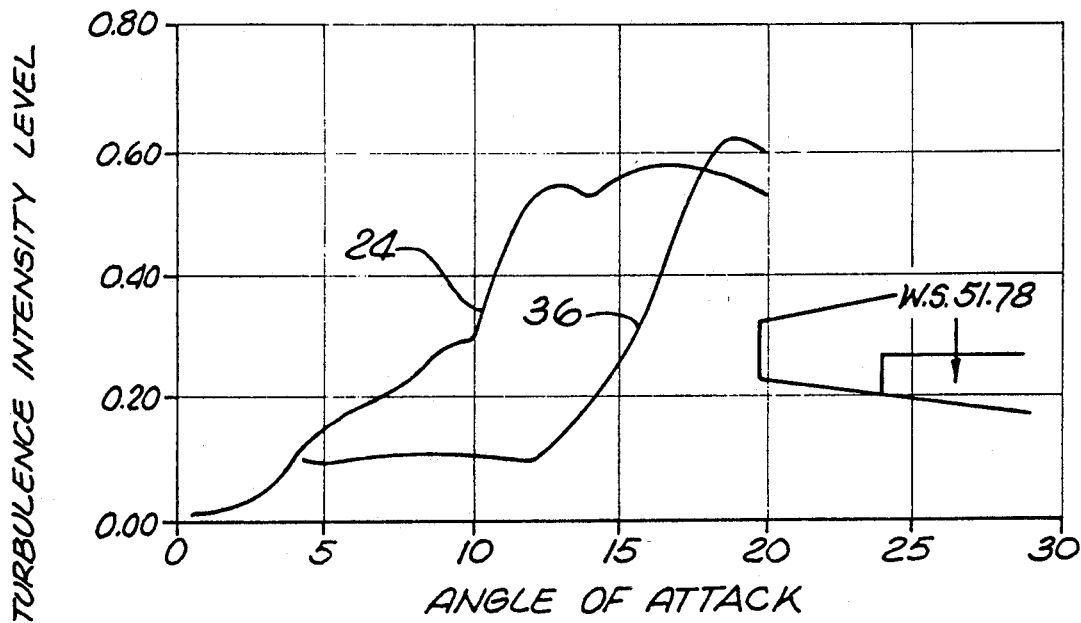
Figure 5:
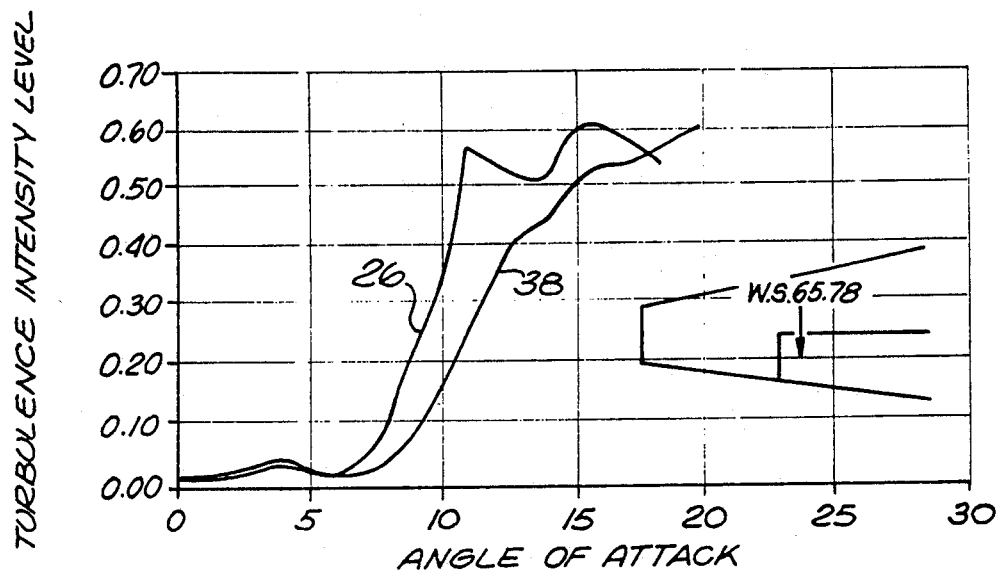

First referring to FIG. 1, an unmodified T-38 aircraft may be seen. This configuration exhibits a pitching moment coefficient versus lift coefficient curve illustrated in FIG. 2 as curve 20. As may be seen therein, the curve is relatively linear and well behaved at lower coefficients of lift, but undergoes relatively rapid changes at higher coefficients of lift. Also the turbulence intensity levels at various wing stations for this basic configuration are shown FIGS. 3, 4, and 5, specifically by curves 22, 24 (actually two curves illustrating the repeatability of the test data) and 26 respectively. Because of the characteristics illustrated in these curves, the final approach angle of attack during landing of the T-38 is generally limited to 5.2°, which limits the buffeting as well as the change in the pitching moment from that of low angle of attack operation.

Figure 6:
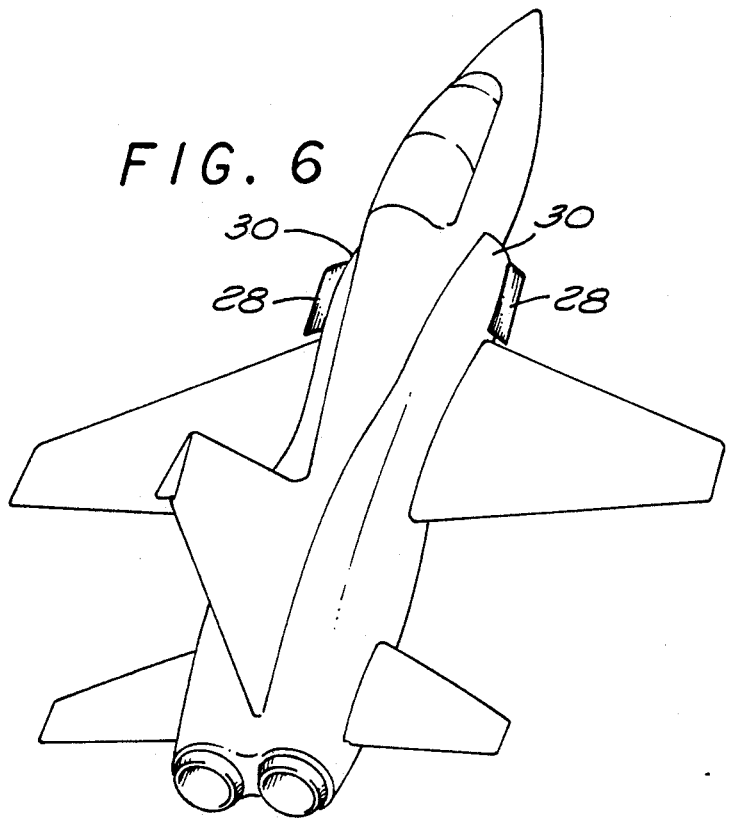
FIG. 6 is a schematic view of a T-38 incorporating the strakes of the present invention.

Now referring to FIG. 6, a preferred embodiment of the present invention may be seen. As shown therein, added to the basic T-38 airframe are a pair of strakes 28 mounted to the engine nacelles 30, just forward of the wing leading edge at the root thereof and at an elevation substantially above the plane of the respective wing. In the specific embodiment shown, the strakes have a substantially zero angle of incidence with respect to the wing, are mounted to the engine nacelles themselves approximately 12 inches above the plane of the wing, and are mounted with a dihedral angle of approximately 0° to 15°.

Figure 7:
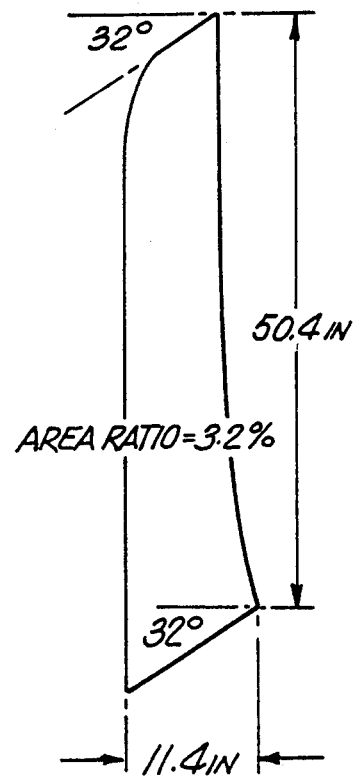
FIG. 7 is a planform view of the strakes of the preferred embodiment of the present invention.

The actual planform of the preferred strake illustrated may be seen in FIG. 7. The leading and trailing edges of the strakes are swept back at approximate 32°, corresponding to the sweep of the wing leading edge of the aircraft. At their widest points, the strakes extend from the engine nacelle 11.4 inches, which with a length of the strake at any position of approximately 50.4 inches provides a total strake area equal to 3.2% of the wing area of the aircraft. Using the 50.4 inches length and the maximum width of 11.4 each strake has an aspect ratio of approximately 0.22, or approximately 0.20 using the tip to tip length of the strake rather than the length of a typical cord thereof. Given the elevation of the attachment to the engine nacelles, the width of the strake and the range of dihedral angles, the outer tips of the strakes are positioned substantially above the plane of the respective wing.

The effect of the strakes of FIG. 6 on the pitching moment versus coefficient of lift curve can be seen in curve 32 of FIG. 2. It may be seen upon comparison of curves 20 and 32 that curve 32 is somewhat similar in general shape to curve 20, though extends outward to substantially higher coefficients of lift before declining relatively rapidly. Also as may be seen from the curves 34, 36 and 38 of FIGS. 3, 4, and 5, when the stakes are used, turbulence is substantially reduced at the inboard wing stations and substantial turbulence only occurs at much larger angles of attack at outboard wing stations, with turbulence still being delayed, although not nearly as much, at still more outboard wing stations. The net effect, of course, is that while excessive buffeting is experienced with the basic T-38 airframe with flaps down at angles of attack above approximately 10°, the addition of the strakes of the preferred embodiment will allow the operation of the aircraft in the flaps down landing configuration at angles of attack of 2° to 3° higher, resulting in an increase in the coefficient of lift of approximately 22%, with of course, an associated reduction in landing speed of approximately 10%, all without any substantial effect on the longitudinal stability of the aircraft. During normal operation at relatively low angles of attack the strakes, like leading edge extensions, have a small effect on the longitudinal stability of the aircraft.

As stated before, the strakes of the preferred embodiment have an area approximately equal to 3.2% of the wing area of the aircraft. Obviously, advantageous effects can be achieved if this percentage is varied, but in general the strakes should be at least approximately 2.5% of the wing area of the aircraft to achieve a substantial amount of the desired effect. Also, the aspect ratio of the strakes may be varied, though generally will be in the range of approximately 0.18 to 0.29. Similarly, strakes which are angled with respect to the wing(i.e.: have dihedral) can produce useful results, though the preferred embodiment with no dihedral or anhedral angle was found to preform better in testing with models. Similarly, while the preferred embodiment strake is a strake of approximately uniform span along its length, tapered strakes or strakes of other shapes may also be used. However, as may be seen in FIG. 6, the preferred embodiment strake of substantially uniform span along its length still extends nearly up to the engine inlet. Accordingly, on the T-38, longer strakes than the preferred embodiment may not readily be used, and accordingly, use of strakes having a different planform such as a substantially tapered strake of the desired strake area would require strakes of greater maximum span, which may be undesired for structural and/or other reasons.

I claim:

1. An apparatus attached to an aircraft that has a fuselage, a pair or wings extending from the fuselage and a pair of nacelles interposed between the fuselage and the wings, comprising:
   a pair of strakes each rigidly attached to an engine nacelle forward and above the wing, said strakes having an area aspect ratio such that vortices are created along the wing roots on the aircraft to increase the lift of the wings when the aircraft is flying at an angle of attack.

2. The apparatus as recited in claim 1, wherein said strakes have a combined area that is at least approximately 2.5% of the wing area.

3. The apparatus as recited in claim 1, wherein said area aspect ratio is between 0.18 and 0.29.

4. An apparatus attached to a T-38 aircraft that has a fuselage, a pair of wings extending from the fuselage and a pair of engine nacelles interposed between the fuselage and the wings, comprising:
   a pair of strakes each rigidly attached to an engine nacelle forward and above the wing, said strakes having an area aspect ratio such that vortices are created along the wing roots of the aircraft to increase the lift of the wings when the aircraft is flying at an angle of attack.

5. The apparatus as recited in claim 4, wherein said strakes have a combined area that is at least approximately 2.5% of the wing area.

6. The apparatus as recited in claim 4, wherein said area aspect ratio is between 0.18 and 0.29.

7. An aircraft, comprising:
   a fuselage;
   a pair of wings extending from said fuselage;
   a pair of engine nacelles interposed between said fuselage and said wings;
   a pair of strakes each rigidly attached to an engine nacelle forward and above the wing, said strakes having an area aspect ratio such that vortices are created along the wing roots of the aircraft to increase the lift of the wings when the aircraft is flying at an angle of attack.

8. The aircraft as recited in claim 7, wherein said strakes have a combined area that is at least approximately 2.5% of the wing area.

9. The aircraft as recited in claim 7, wherein said area aspect ratio is between 0.18 and 0.29.

10. A T-38 aircraft, comprising:
    a fuselage;
    a pair of wings extending from said fuselage;

a pair of engine nacelles interposed between said fuselage and said wings;

a pair of strakes each rigidly attached to an engine nacelle forward and above the wing, said strakes having an area aspect ratio such that vortices are created along the wing roots of the aircraft to increase the lift of the wings when the aircraft is flying at an angle of attack.

11. The T-38 aircraft as recited in claim 10, wherein said strakes have a combined area that is at least approximately 2.5% of the wing area.

12. The T-38 aircraft as recited in claim 10, wherein said area aspect ratio is between 0.18 and 0.29.

* * * * *

UNITED STATES PATENT AND TRADEMARK OFFICE
CERTIFICATE OF CORRECTION

PATENT NO. : 5,249,762
DATED : October 5, 1993
INVENTOR(S) : Skow

It is certified that error appears in the above-indentified patent and that said Letters Patent is hereby corrected as shown below:

TITLE PAGE, ITEM [73] - delete "Eidetics Internation, Inc."
insert --Eidetics International, Inc.--

Signed and Sealed this

Twenty-ninth Day of October 1996

Attest:

BRUCE LEHMAN

Attesting Officer     Commissioner of Patents and Trademarks